(12) United States Patent
Thackeray et al.

(10) Patent No.: US 7,964,310 B2
(45) Date of Patent: *Jun. 21, 2011

(54) ELECTROCHEMICAL CELL

(75) Inventors: Michael M. Thackeray, Pretoria (ZA); Rosalind J. Gummow, Pretoria (ZA); Ernest E Ferg, Wilro Park (ZA)

(73) Assignee: Technology Finance Corporation (Proprietary) Limited, Sandton (ZA)

( * ) Notice: Subject to any disclaimer, the term of this patent is extended or adjusted under 35 U.S.C. 154(b) by 0 days.

This patent is subject to a terminal disclaimer.

(21) Appl. No.: 12/972,066

(22) Filed: Dec. 17, 2010

(65) Prior Publication Data

US 2011/0086277 A1    Apr. 14, 2011

Related U.S. Application Data

(60) Continuation of application No. 12/823,977, filed on Jun. 25, 2010, now Pat. No. 7,855,016, which is a continuation of application No. 11/931,490, filed on Oct. 31, 2007, now Pat. No. 7,824,804, which is a division of application No. 10/228,734, filed on Aug. 27, 2002, now Pat. No. 7,452,630, which is a continuation of application No. 08/206,792, filed on Mar. 4, 1994, now abandoned.

(30) Foreign Application Priority Data

Sep. 2, 1993 (ZA) ........................... 93/6488

(51) Int. Cl.
*H01M 4/48* (2010.01)
*H01M 4/52* (2010.01)

(52) U.S. Cl. .................. 429/231.5; 429/231.1; 429/223; 429/317; 429/324

(58) Field of Classification Search .................. None
See application file for complete search history.

(56) References Cited

U.S. PATENT DOCUMENTS

| | | | | |
|---|---|---|---|---|
| 4,366,215 A | | 12/1982 | Coetzer et al. ................. | 429/199 |
| 4,507,371 A | * | 3/1985 | Thackeray et al. ............ | 429/322 |
| 4,980,251 A | | 12/1990 | Thackeray et al. ............ | 429/224 |
| 5,147,739 A | * | 9/1992 | Beard ............................ | 429/343 |
| 5,160,712 A | | 11/1992 | Thackeray et al. ............ | 423/138 |
| 5,187,033 A | | 2/1993 | Koshiba ........................ | 429/231.1 |
| 5,202,201 A | * | 4/1993 | Meunier et al. ................ | 429/322 |
| 5,284,721 A | | 2/1994 | Beard ............................ | 429/194 |
| 5,286,582 A | * | 2/1994 | Tahara et al. .................. | 429/220 |
| 5,316,877 A | | 5/1994 | Thackeray et al. ............ | 429/197 |
| 5,478,671 A | * | 12/1995 | Idota .............................. | 429/221 |
| 5,545,468 A | | 8/1996 | Koshiba et al. ............... | 429/231.1 |
| 7,452,630 B2 | | 11/2008 | Thackeray et al. ......... | 429/218.1 |
| 7,556,890 B2 | | 7/2009 | Thackeray et al. ......... | 429/231.1 |
| 7,722,990 B2 | | 5/2010 | Thackeray et al. ......... | 429/231.1 |
| 7,824,804 B2 | | 11/2010 | Thackeray et al. ......... | 429/231.5 |
| 7,838,149 B2 | | 11/2010 | Thackeray et al. ......... | 429/218.1 |
| 7,855,016 B2 | | 12/2010 | Thackeray et al. ......... | 429/231.5 |

FOREIGN PATENT DOCUMENTS

| | | |
|---|---|---|
| EP | 0391281 | 10/1990 |
| EP | 0567149 | 10/1993 |
| FR | 2469013 | 5/1981 |
| GB | 2122412 | 1/1984 |
| GB | 2221213 | 1/1990 |
| GB | 2245264 | 1/1992 |
| GB | 2251119 | 6/1992 |
| GB | 2270195 | 3/1994 |
| JP | 57-152669 | 9/1982 |
| JP | 63-001708 | 1/1988 |
| JP | 04087268 | 3/1992 |

OTHER PUBLICATIONS

Colbow et al., "Structure and eletrochemistry of the spinel oxides $LiTi_2O_4$ and $LI_{4/3}Ti_{5/3}O_4$," *J. Power Sources*, 26:397-402, 1989.

De Picciotto et al., "An electrochemical study of the systems $Li_{1+x}V_2O_4$ and $Li_{1-x}VO_2$ ($0 \leq x \leq 1$)," *Solid State Ionics*, 28-30:1634-1670, 1988.

De Picciotto et al., "Lithium insertion/extractions reactions with $LiVO_2$ and $LiV_2O_4$," *Solid State Ionics*, 18-19:773-777, 1986.

Fauteux et al., "Rechargeable lithium battery anodes: alternatives to metallic lithium," *J. of Applied Electrochemistry*, 23:1-10,1993.

Murphy et al., "Ternary $Li_xTiO_2$ phases from insertion reactions," *Solid State Ionics*, 9 & 10:413-417, 1983.

(Continued)

*Primary Examiner* — John S Maples
(74) *Attorney, Agent, or Firm* — Fulbright & Jaworski L.L.P.

(57) ABSTRACT

An electrochemical cell comprises as an anode, a lithium transition metal oxide or sulphide compound which has a $[B_2]X_4^{n-}$ spinel-type framework structure of an $A[B_2]X_4$ spinel wherein A and B are metal cations selected from Li, Ti, V, Mn, Fe and Co, X is oxygen or sulphur, and n– refers to the overall charge of the structural unit $[B_2]X_4$ of the framework structure. The transition metal cation in the fully discharged state has a mean oxidation state greater than +3 for Ti, +3 for V, +3.5 for Mn, +2 for Fe and +2 for Co. The cell includes as a cathode, a lithium metal oxide or sulphide compound. An electrically insulative lithium containing liquid or polymeric electronically conductive electrolyte is provided between the anode and the cathode.

5 Claims, 8 Drawing Sheets

OTHER PUBLICATIONS

Office Action, issued in U.S. Appl. No. 12/353,785, mail date Apr. 1, 2009.
Office Action, issued in U.S. Appl. No. 08/206,792, mail date Feb. 6, 1995.
Office Action, issued in U.S. Appl. No. 08/206,792, mail date Nov. 7, 1995.
Office Action, issued in U.S. Appl. No. 08/206,792, mail date Sep. 16, 1996.
Office Action, issued in U.S. Appl. No. 10/228,734, mail date Apr. 7, 2008.
Office Action, issued in U.S. Appl. No. 10/228,734, mail date Aug. 10, 2007.
Office Action, issued in U.S. Appl. No. 10/228,734, mail date Dec. 27, 2004.
Office Communication, issued in U.S. Appl. No. 11/931,490, mail date Jan. 5, 2010.
Office Communication, issued in U.S. Appl. No. 11/931,490, mail date Jul. 14, 2009.
Office Communication, issued in U.S. Appl. No. 11/931,490, mail date Apr. 13, 2009.
Office Communication, issued in U.S. Appl. No. 12/823,977, dated Aug. 12, 2010.
Thackeray et al., "Electrochemical extraction of lithium from limn2o4," *Mat. Res. Bull.*, 19:179-187, 1984.
U.S. Appl. No. 08/206,792 entitled "Electrochemical Cell" by Michael Thackeray et al., filed Mar. 4, 1994.

* cited by examiner a) $LiFe_5O_8/Li_{1.03}Mn_{1.97}O_4$
b) Li–Fe–Ti oxide spinel/$Li_{1.03}Mn_{1.97}O_4$ Li/Li-Fe-Ti oxide spinel

ELECTROCHEMICAL CELL

THIS INVENTION relates to an electrochemical cell.

This application is continuation of U.S. application Ser. No. 12/823,977 filed Jun. 25, 2010, now U.S. Pat. No. 7,855,016, which is a continuation of U.S. application Ser. No. 11/931,490 filed Oct. 31, 2007, now U.S. Pat. No. 7,824,804, which is a divisional of U.S. application Ser. No. 10/228,734 filed Aug. 27, 2002, now U.S. Pat. No. 7,452,630, which is a continuation of U.S. application Ser. No. 08/206,792 filed Mar. 4, 1994, abandoned, which claims priority to South African Application No. 93/6488 filed Sep. 2, 1993. The entire text of each of the above-referenced disclosures is specifically incorporated herein by reference without disclaimer.

According to the invention, there is provided an electrochemical cell, which comprises

- as at least part of an anode, a lithium transition metal oxide or sulphide compound which has a $[B_2]X_4^{n-}$ spinel-type framework structure of an $A[B_2]X_4$ spinel wherein A and B are metal cations selected from Li, Ti, V, Mn, Fe and Co, X is oxygen (O) or sulphur (S), and n− refers to the overall charge of the structural unit $[B_2]X_4$ of the framework structure, and the transition metal cation of which in its fully discharged state has a mean oxidation state greater than +3 for Ti, +3 for V, +3.5 for Mn, +2 for Fe and +2 for Co;
- as at least part of a cathode, a lithium metal oxide or sulphide compound; and
- an electrically insulative lithium containing liquid or polymeric electronically conductive electrolyte between the anode and the cathode, such that, on discharging the cell, lithium ions are extracted from the spinel-type framework structure of the anode, with the oxidation state of the metal ions of the anode thereby increasing, while a concomitant insertion of lithium ions into the compound of the cathode takes place, with the oxidation state of the metal ions of the cathode decreasing correspondingly.

The compounds of the anode and cathode may, in particular, be lithium metal oxide compounds.

While the cell can be a primary cell, it is envisaged that it may, in particular, be a rechargeable or secondary cell in which the reverse reactions to those set out above, take place during charging of the cell.

Thus, spinel compounds have structures that can be represented by the general formula $A[B_2]X_4$ given hereinbefore, and in which the X atoms are ideally arranged in a cubic-close-packed fashion to form a negatively charged anion array comprised of face-sharing and edge-sharing X tetrahedra and octahedra. In the formula $A[B_2]X_4$, the A cations and B cations occupy tetrahedral and octahedral sites respectively. In the ideal spinel structure, with the origin of the unit cell at the centre ($\overline{3}$m), the close-packed anions are located at the 32e positions of the space group Fd3m. Each unit cell contains 64 tetrahedral interstices situated at three crystallographically non-equivalent positions 8a, 8b and 48f, and 32 octahedral interstices situated at the crystallographically non-equivalent positions 16c and 16d.

In the $A[B_2]X_4$ spinel, the A cations reside in the 8a tetrahedral interstices and the B cations in the 16d octahedral interstices. There are thus 56 empty tetrahedral and 16 empty octahedral sites per cubic unit cell.

The framework structure of the lithium metal oxide compound of the anode thus has, as its basic structural unit, a unit of the formula $[B_2]X_4^{n-}$ as hereinbefore described.

In the anode of the cell of the present invention, therefore, the B cations of the $[B_2]X_4^{n-}$ host framework structure may be regarded as being located at the 16d octahedral positions, and the X anions as being located at the 32e positions of the spinel structure. The tetrahedra defined by the 8a, 8b and 48f positions and the octahedra defined by the 16c positions of the spinel structure thus form, the interstitial space of the $[B_2]X_4^{n-}$ framework structure for the diffusion of mobile $Li^+$ cations.

The B cations of the framework structure may consist of one cationic type, or more than one cationic type of identical or mixed valence to provide various $[B_2]X_4^{n-}$ framework structures, the overall charge of which can vary over a wide range.

Spinel compounds having the $[B_2]X_4^{n-}$ framework structure may also be characterized by crystallographic space groups other than the prototypic cubic space group Fd3m, and may therefore not have the ideal cubic-close-packed structures hereinbefore described. For example, in $Li_{1+x}[Mn_2]O_4$ compounds with $0 \leq x \leq 1$, ie compounds in which A is Li, and B is Mn, the spinel structure is distorted, as a result of the Jahn-Teller $Mn^{3+}$ octahedral site ions, to tetragonal symmetry, and the compound is characterized by the tetragonal space groups $F4_1/ddm$, or, alternatively, $I4_1/amd$ in which the tetrahedral and octahedral site nomenclature differs from that as defined by the space group Fd3m.

Furthermore, the anode need not necessarily be a stoichiometric spinel compound, but can instead be a defect spinel. Defect spinels are well known in the large family of spinel compounds and can have vacancies on the A sites, or on the B sites, or on both the A sites and B sites. For example, compounds can be synthesized in which defects are created by varying the quantity of B cations in the framework structure such that additional $Li^+$ cations can enter and leave the framework. In these instances additional $Li^+$ cations can partially occupy the 16d octahedral sites normally occupied by the B-type cations. Under such circumstances these partially occupied octahedra can be considered to form part of the interstitial space. Conversely, compounds can also be synthesized, in which part of the interstitial space defined by the 8a, 8b and 48f tetrahedral and 16c octahedral interstices of the Spinel structure can be occupied by B-type cations, thereby rendering these particular sites at least partially inaccessible to the mobile Li cations. The $[B_2]X_4^{n-}$ framework structure can contain in certain instances a minor proportion, typically less than 10 atomic percent, of cations other than the mobile Li-type cations, or the A and B-type cations, within the framework structure or within the interstitial spaces of the framework structure, and that could serve to stabilize the structure. For example, doped spinels of stoichiometry $Li_{1+\delta}Mn_{2-\delta}O_4$ where $0<\delta \leq 0,1$, for example, $Li_{1.03}Mn_{1.97}O_4$ in which $\delta=0,03$, and $LiM_{\delta/2}Mn_{2-\delta}O_4$ where M=Mg or Zn and $0<\delta \leq 0,05$, for example, $LiMg_{0.025}Mn_{1.95}O_4$, are more stable to cycling than the stoichiometric spinel $LiMn_2O_4$.

The compound of the anode may be a stoichiometric spinel selected from the group comprising $Li_4Mn_5O_{12}$, which can be written as $(Li)_{8a}[Li_{0.33}Mn_{1.67}]_{16d}O_4$ in ideal spinel notation; $Li_4Ti_5O_{12}$, which can be written as $(Li)_{8a}[Li_{0.33}Ti_{1.67}]_{16d}O_4$ in ideal spinel notation; $LiTi_2O_4$ which can be written as $(Li)_{8a}[Ti_2]_{16d}O_4$ in ideal spinel notation; $LiV_2O_4$, which can be written as $(Li)_{8a}[V_2]_{16d}O_4$ in ideal spinel notation; and $LiFe_5O_8$, which can be written as $(Fe)_{8a}[Fe_{1.5}Li_{0.5}]_{16d}O_4$ in ideal spinel notation.

Instead, the compound of the anode may be a defect spinel selected from the group comprising $Li_2Mn_4O_9$, which can be written as $(Li_{0.89}\square_{0.11})_{8a}[Mn_{1.78}\square_{0.22}]_{16d}O_4$ in spinel notation; and $Li_2Ti_3O_7$, which can be written as $(Li_{0.85}\square_{0.15})_{8a}$ $[Ti_{1.71}Li_{0.29}]_{16d}O_4$ in spinel notation. In defect spinels, the distribution of $Li^+$ on the A and B sites can vary from compound to compound.

Instead, the compound of the anode may have a spinel-type structure, which can be a stoichiometric or defect spinel, with a mixture of transition metal cations such as a lithium-iron-titanium oxide in which the lithium and iron cations are located on the A-sites, and lithium, iron and titanium cations on the B-sites.

In a preferred embodiment of the invention, the transition metal cations, Ti, V, Mn, Fe and Co, reside predominantly or completely on the B-sites of the spinel structure, while the Li cations reside predominantly or completely on the A-sites of the structure.

The lithium metal oxide compound of the cathode may also have a spinel-type framework structure. Thus, the framework structure of the lithium metal oxide compound of the cathode may then also have, as its basic structural unit, a unit of the formula $[B_2]X_4^{n-}$ of an $A[B_2]X_4$ spinel, as hereinbefore described, with the transition metal cations of the anode being more electropositive than those of the cathode.

In the compound of the cathode, A and B may be a metal cation of one type, or a mixture of different metal cations. The compound of the cathode may be a stoichiometric or defect spinel compound, as hereinbefore described.

When the compound of the cathode has a spinel-type structure, it may be selected from the group having as its B-type cations Li, Mn, Co or Ni, or mixtures thereof, such as $Li_xMn_2O_4$ where $0<x\leq1$ and $Li_xCO_2O_4$ where $0<x\leq2$, optionally doped with additional metal cations to stabilize the structure as hereinbefore described.

Instead, the compound of the cathode may have another structure type, for example a layered type structure such as that found within a system defined by a formula $Li_xCO_{1-y}Ni_yO_2$ where $0\leq y\leq1$ and $0<x\leq1$.

In general, the anode compound will be selected from those spinel compounds that offer a relatively low voltage vs pure lithium, typically those that offer 3V or less, while the cathode compound will be selected from those spinel compounds that offer a relatively high voltage vs pure lithium, typically those that offer between 4.5V and 3V. For example, a $Li/Li_{4+x}Ti_5O_{12}$ cell delivers on discharge at 100 $\mu A/cm^2$ (for $0<x<1$) an average voltage of approximately 1.5V, while a $Li/Li_xMn_2O_4$ cell delivers on discharge at 100 $\mu A/cm^2$ (for $0<x<1$) an average voltage of approximately 4V. Therefore, a cell in accordance with the invention can have $Li_{4+x}Ti_5O_{12}$ as an anode and $Li_xMn_2O_4$ as a cathode, and will deliver approximately 2.5V on discharge and which is approximately twice the voltage of a nickel-cadmium cell. In another example, a $Li/Li_2Mn_4O_9$ cell delivers a voltage of approximately 2.8V over most of the discharge. Thus, a cell in accordance with the invention can have a $Li_{2+x}Mn_4O_9$ anode and $Li_xMn_2O_4$ as cathode, and delivers approximately 1.2V on discharge, which is the typical voltage of a nickel-cadmium cell. It is convenient to load such cells in a discharged state, ie with the following configurations:

$$Li_4Ti_5O_{12}/Electrolyte/LiMn_2O_4 \qquad (1)$$

$$Li_2Mn_4O_9/Electrolyte/LiMn_2O_4 \qquad (2)$$

Although it is convenient to load such cells in a discharged state, the cells may also be loaded in the charged state, if so desired. In this respect, the anodes of the invention have lithiated spinel structures and delithiated spinel structures that have the $[B_2]X_4$ spinel framework as defined hereinbefore.

In (1), $Li^+$ ions are extracted from $Li[Mn_2]O_4$ during charge with a concomitant oxidation of the manganese ions from an average valence of 3.5 to higher values, and inserted into the $Li_4Ti_5O_{12}$ electrode structure with a concomitant reduction of the titanium cations from the average valence state of +4 to lower values. During this process $Li^+$ ions are shuttled between the oxide structures without the formation of any metallic lithium, the cell voltage being derived from changes in the oxidation state of the transition metal cations in the anode and cathode structures.

The electrolyte may be a room temperature electrolyte such as $LiClO_4$, $LiBF_4$, or $LiPF_6$ dissolved in an appropriate organic salt such as propylene carbonate, ethylene carbonate, dimethyl carbonate, dimethoxyethane, or appropriate mixtures thereof. Instead, however, it may be any appropriate polymeric electrolyte such as polyethylene oxide (PEO)—$LiClO_4$, PEO—$LiSO_3CF_3$ and PEO—$LiN(CF_3SO_2)_2$, that operates at room temperature or at elevated temperature, eg at about 120° C.

The invention will now be described by way of non-limiting examples, and with reference to the accompanying drawings in which.

The following stoichiometric spinel and defect spinel compounds were selected for use as anode materials in the examples following hereinafter:
a) $Li_2Mn_4O_9$
b) $Li_4Mn_5O_{12}$
c) $Li_4Ti_5O_{12}$
d) $LiFe_5O_8$
e) Li—Fe—Ti oxide spinel in which Li:Fe:Ti=2:2:1

Powder X-ray diffraction patterns of these compounds are given in FIGS. 1a-e respectively.

The following spinel and non-spinel compounds were selected for use as cathode materials in the examples following hereinafter:
a) $LiMn_2O_4$ (spinel-type structure)
b) $Li_{1.03}Mn_{1.97}O_4$ (spinel-type structure)
c) $LiCoO_2$ (layered-type structure)

Figure 2:
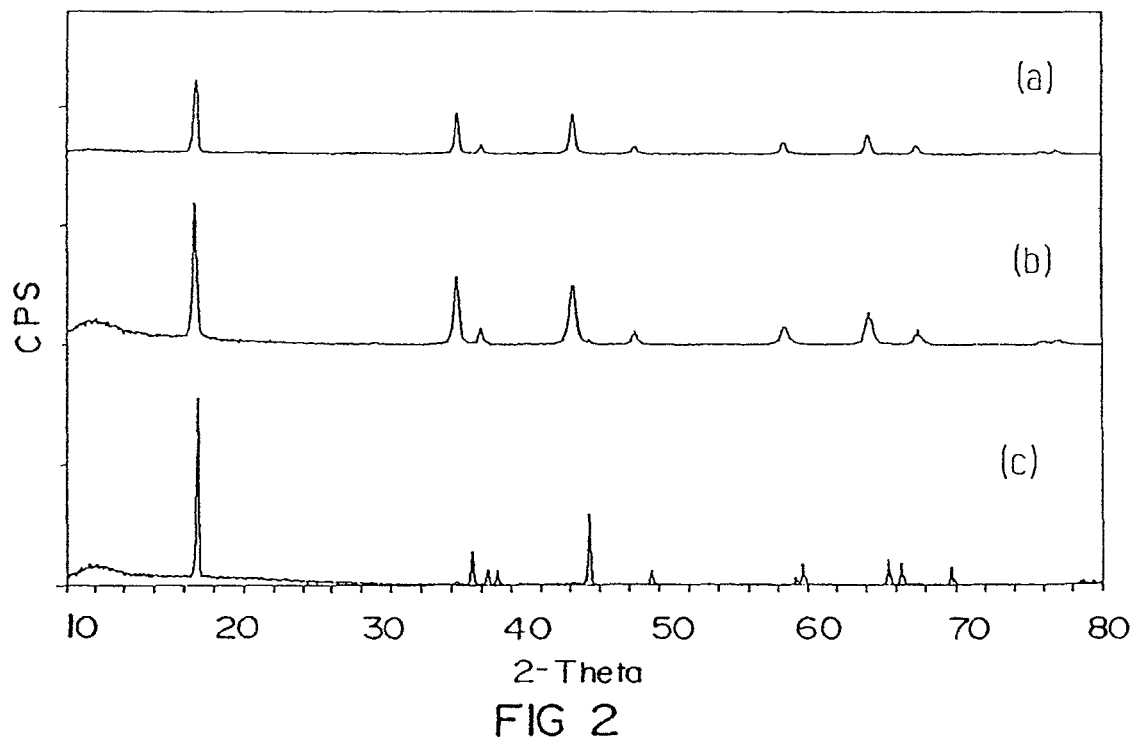
FIG. 2 shows powder X-ray diffraction patterns of compounds suitable for use as cathode materials in rechargeable electrochemical cells according to the invention.

Powder X-ray diffraction patterns of these compounds are given in FIG. 2a-c respectively.

EXAMPLE 1

Figure 3:
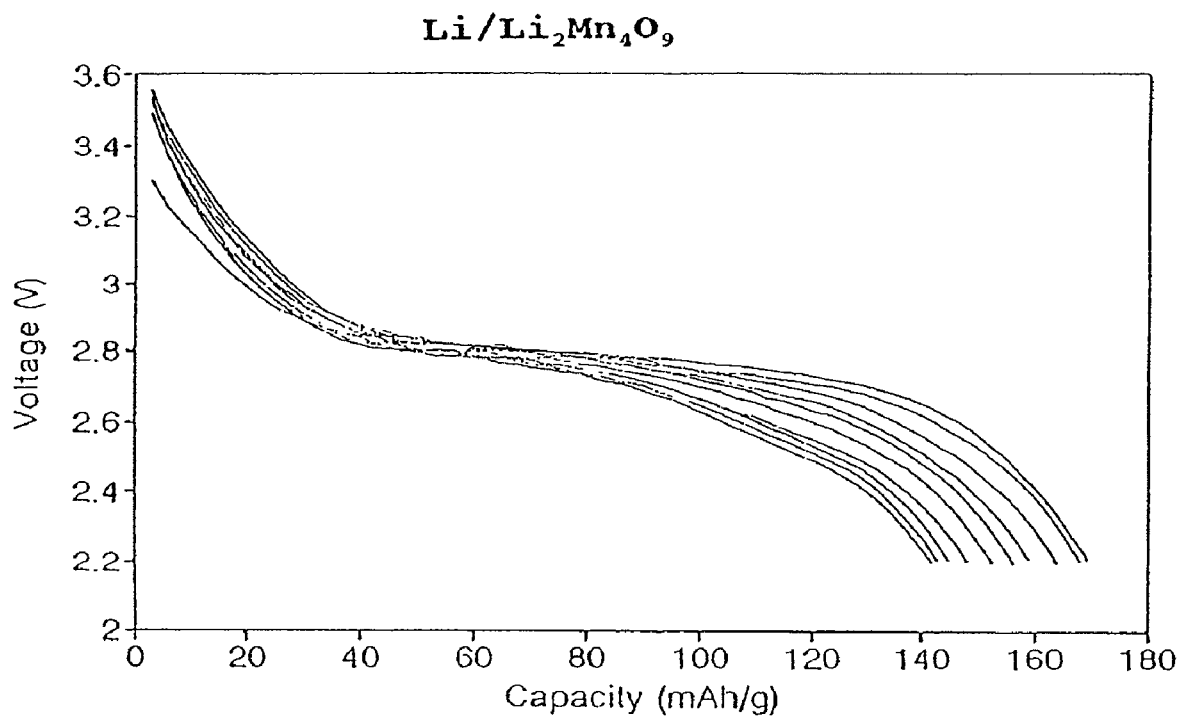
FIG. 3 shows a plot of voltage vs capacity for a known $Li/Li_2Mn_4O_9$ cell.
Figure 8:
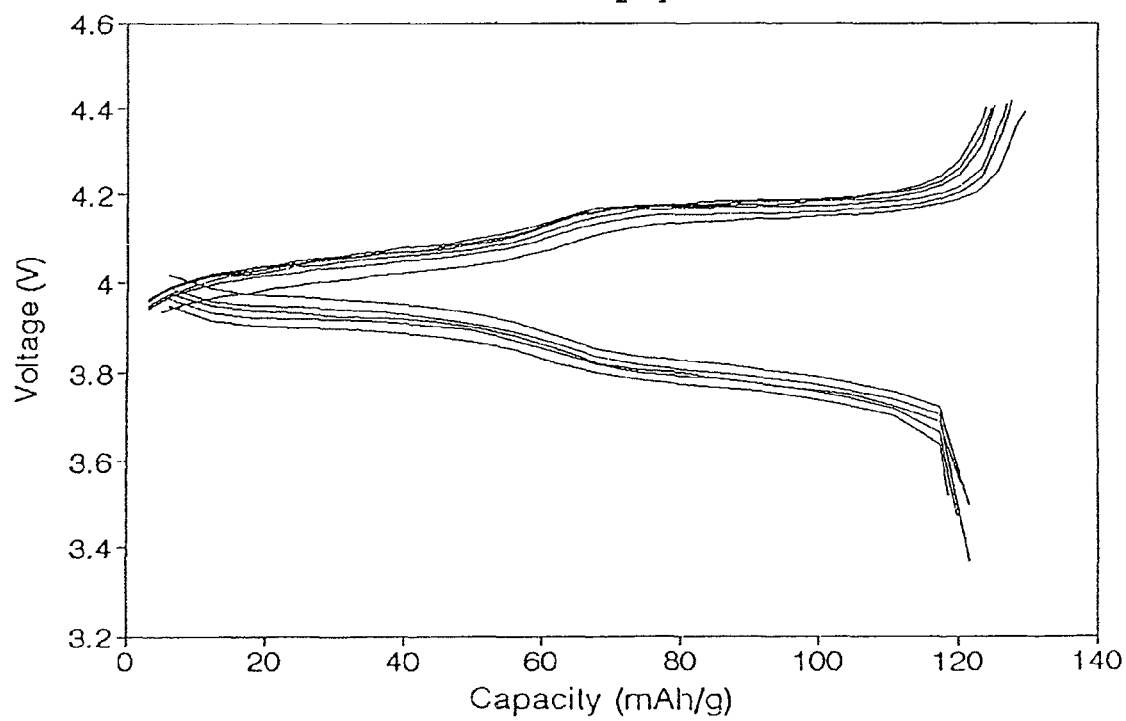
FIG. 8 shows a plot of voltage vs capacity for a known $Li/LiMn_2O_4$ cell.

In view thereof that a $Li/Li_2Mn_4O_9$ cell delivers on discharge 150 mAh/g at an average voltage of approximately 2.8V, as indicated in FIG. 3, and a $Li/LiMn_2O_4$ cell delivers on discharge 120 mAh/g at an average voltage of approximately 3.8V, as indicated in FIG. 8, a cell in accordance with the invention and having the configuration $Li_2Mn_4O_9$(anode)/Electrolyte/$LiMn_2O_4$(cathode) (2) was constructed.

The $LiMn_2O_4$ spinel compound of the cathode was synthesized by reaction of LiOH and γ-$MnO_2$ (chemically-prepared manganese dioxide, CMD) firstly at 450° C. for 48 hours and thereafter at 750° C. for 48 hours. The powder X-ray diffraction pattern of this compound is shown in FIG. 2a.

Figure 1:
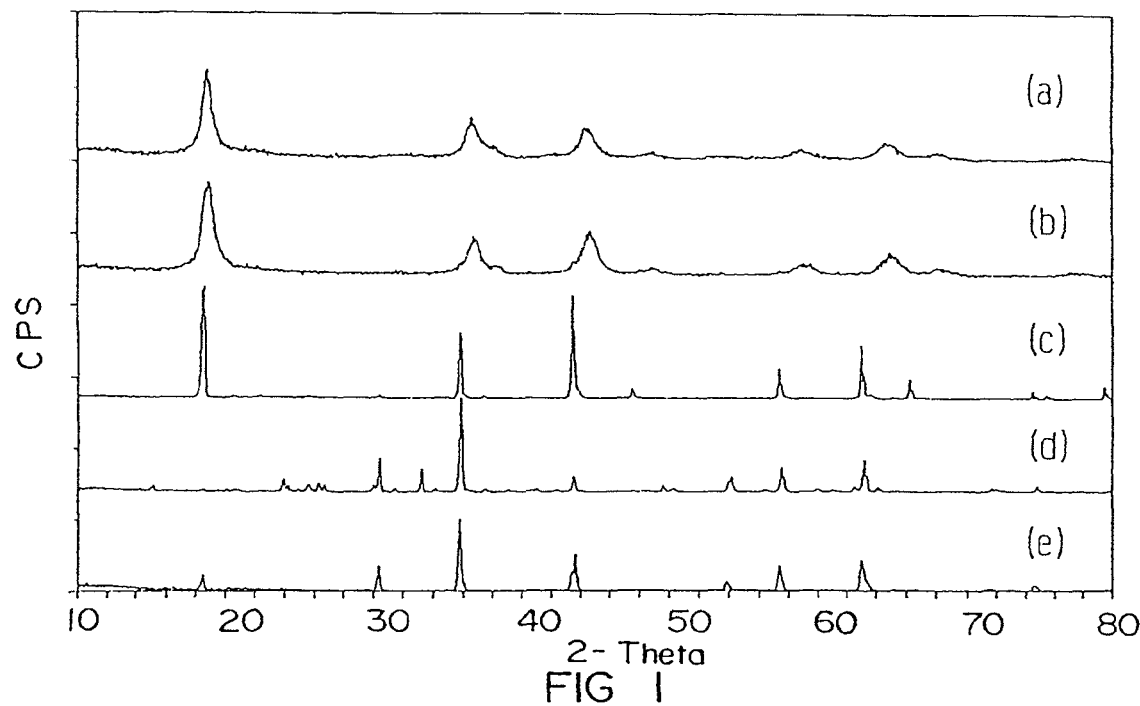
FIG. 1 shows powder X-ray diffraction patterns of compounds suitable for use as anode materials in rechargeable electrochemical cells according to the invention.

$Li_2Mn_4O_9$ was synthesized by reaction of LiOH and $MnCO_3$ at 345° C. for 32 hours. The powder X-ray diffraction pattern of this compound is shown in FIG. 1a. The pattern is predominantly characteristic of the $Li_2Mn_4O_9$ defect spinel phase, but contains in addition a few very weak peaks, for example at 42° 2θ and 53° 2θ, that are indicative of a very minor proportion of lithiated γ-$MnO_2$ phase.

Figure 11:
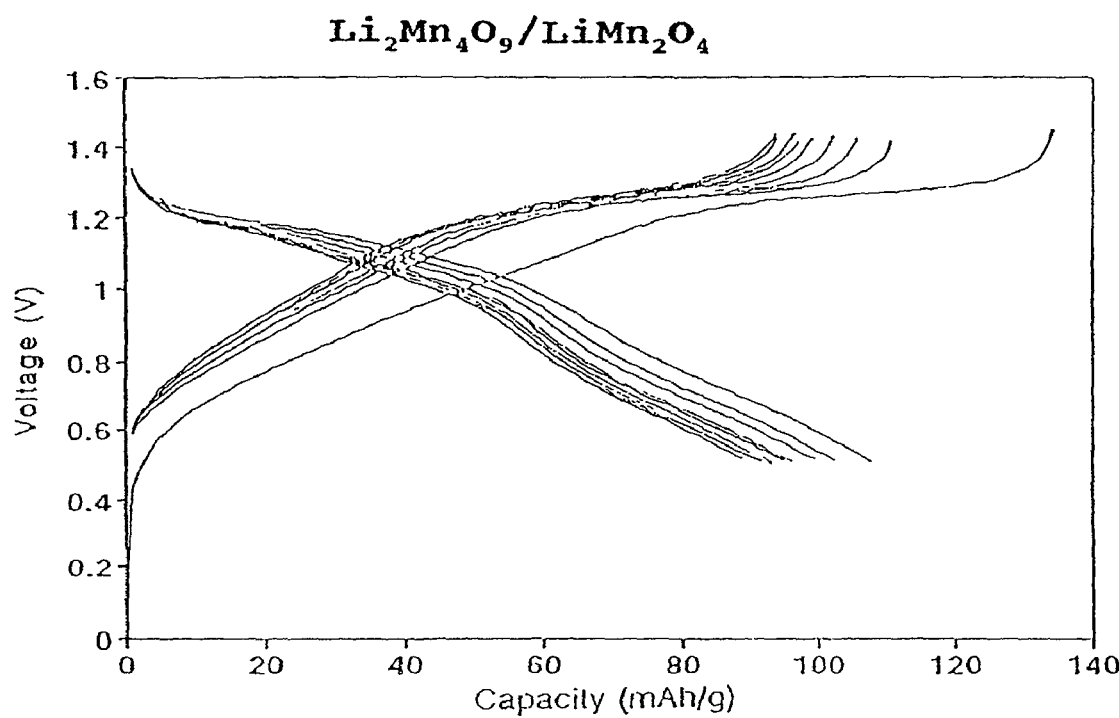
FIG. 11 shows a plot of voltage vs capacity for the cell of Example 1 and which is in accordance with the invention.

A cell of the format $Li_2Mn_4O_9$/Electrolyte/$LiMn_2O_4$ (2) was then constructed. The electrolyte used was 1M $LiClO_4$ in propylene carbonate. The first 9 charge and 8 discharge cycles of the cell are shown in FIG. 11. A current of 0.1 mA was employed for both charge and discharge. The cell was cycled between upper and lower voltage limits of 1.5V and 0.45V respectively.

EXAMPLE 2

Figure 4:
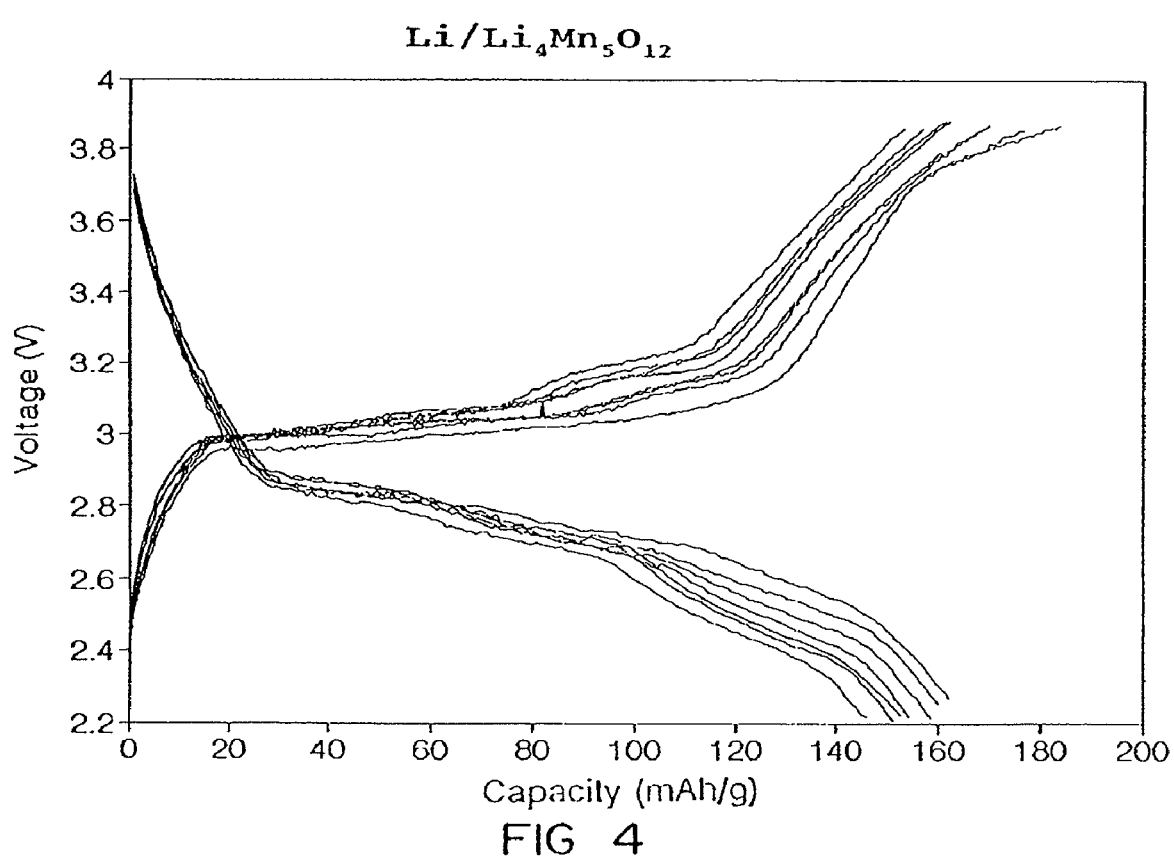
FIG. 4 shows a plot of voltage vs capacity for a known $Li/Li_4Mn_5O_{12}$ cell.
Figure 9:
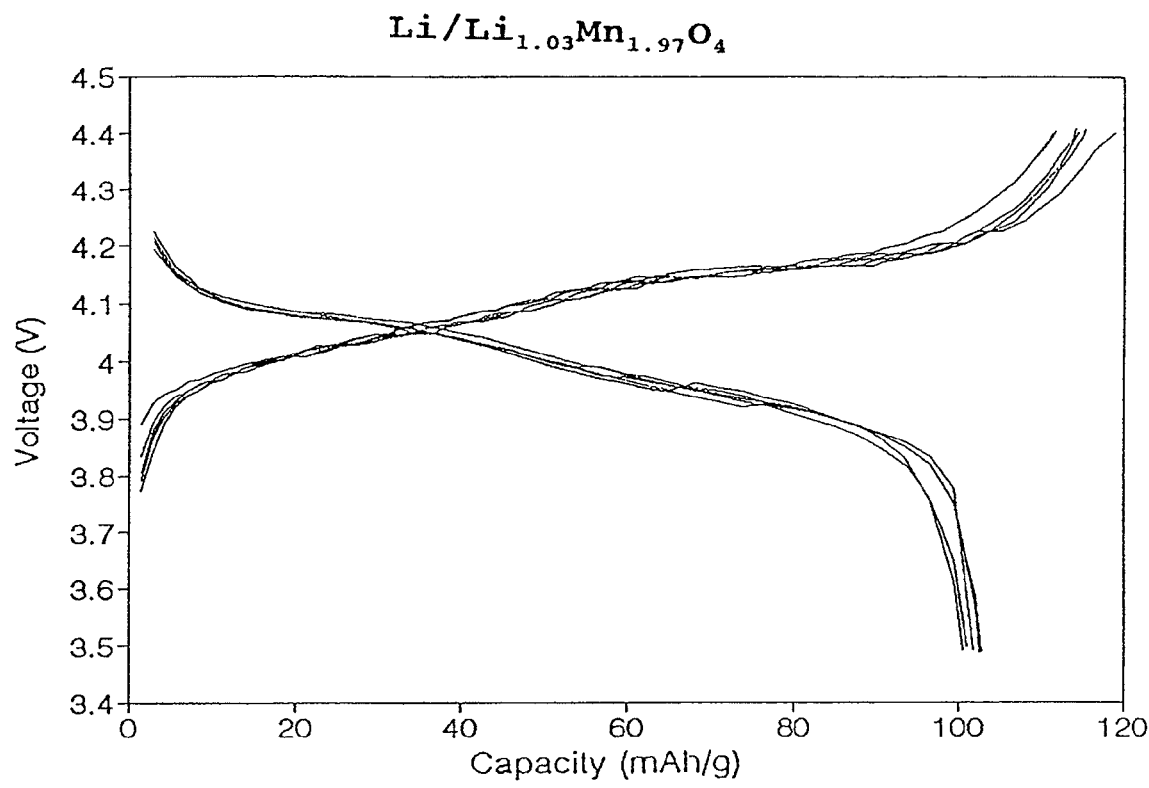
FIG. 9 shows a plot of voltage vs capacity for a known $Li/Li_{1.03}Mn_{1.97}O_4$ cell.

In view thereof that a $Li/Li_4Mn_5O_{12}$ cell delivers on discharge 150 mAh/g at an average voltage of approximately 2.7V, as indicated in FIG. 4, and a $Li/Li_{1.03}Mn_{1.97}O_4$ cell delivers on discharge 100 mAh/g at an average voltage of approximately 3.9V, as indicated in FIG. 9, a cell in accordance with the invention and having the configuration $Li_4Mn_5O_{12}$/Electrolyte/$Li_{1.03}Mn_{1.97}O_4$ (3) was constructed.

The $Li_{1.03}Mn_{1.97}O_4$ spinel compound of the cathode was synthesized by the reaction of LiOH and γ-$MnO_2$ (chemically-prepared manganese dioxide, CMD) firstly at 450° C. for 48 hours and thereafter at 650° C. for 48 hours. The powder X-ray diffraction pattern of this compound is shown in FIG. 2b.

$Li_4Mn_5O_{12}$ was synthesized by the reaction of $Li_2CO_3$ and $MnCO_3$ at 400° C. for 10 hours. The powder X-ray diffraction pattern of this compound is shown in FIG. 1b. The pattern is predominantly characteristic of the $Li_4Mn_5O_{12}$ spinel phase.

Figure 12:
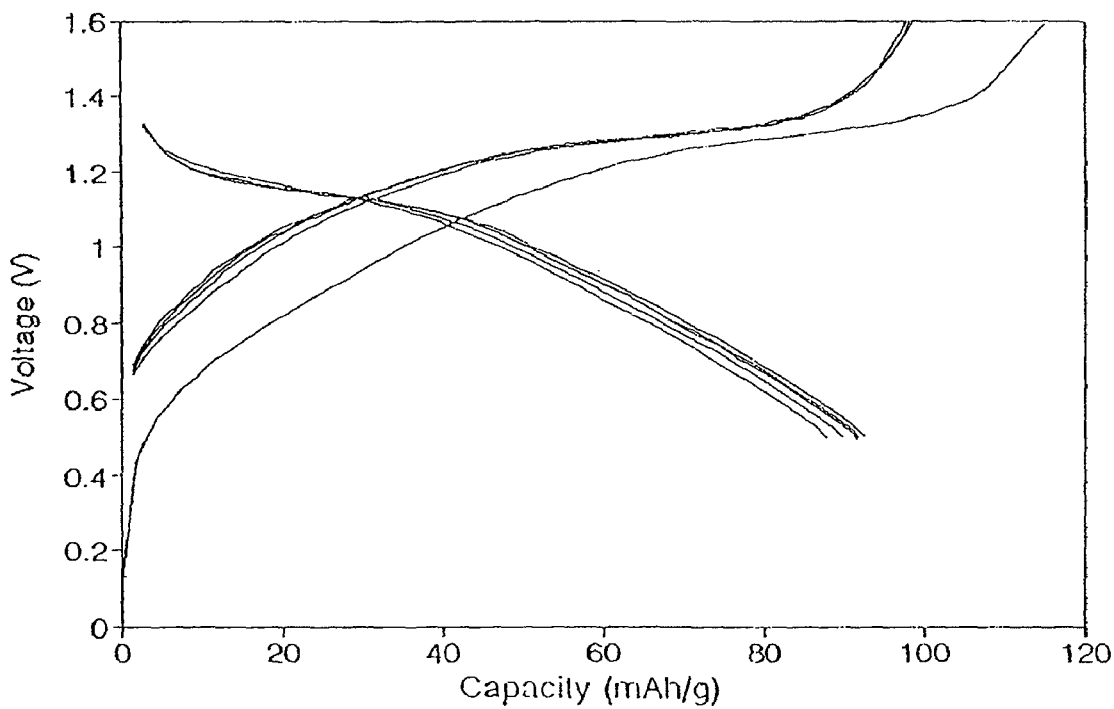
FIG. 12 shows a plot of voltage vs capacity for the cell of Example 2 and which is in accordance with the invention.

A cell of the format $Li_4Mn_5O_{12}$/Electrolyte/$Li_{1.03}Mn_{1.97}O_4$ (3) was then constructed. The electrolyte used was 1M $LiClO_4$ in propylene carbonate. The first 5 charge/discharge cycles of the cell are shown in FIG. 12. A current of 0.1 mA was employed for both charge and discharge. The cell was cycled between upper and lower voltage limits of 1.6V and 0.5V respectively.

EXAMPLE 3

Figure 5:
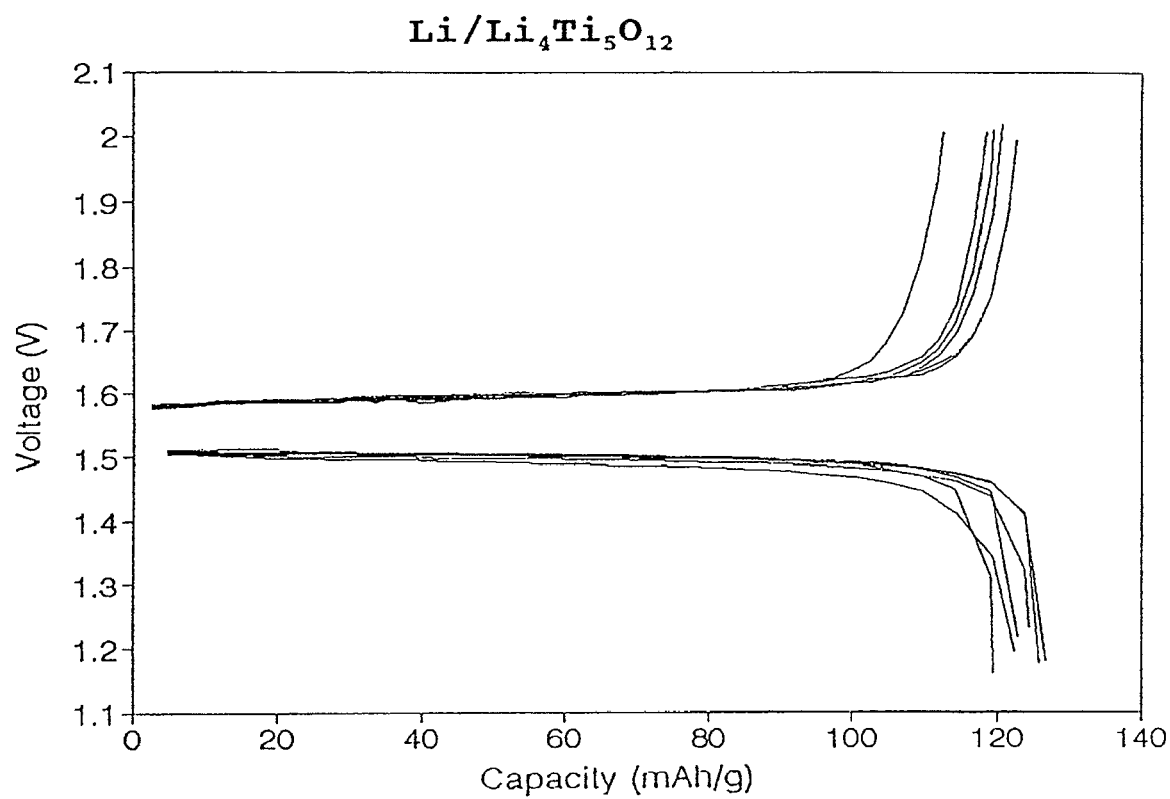
FIG. 5 shows a plot of voltage vs capacity for a known $Li/Li_4Ti_5O_{12}$ cell.

In view thereof that a $Li/Li_4Ti_5O_{12}$ cell delivers on discharge 120 mAh/g at an average voltage of approximately 1.5V, as indicated in FIG. 5, and a $Li/Li_{1.03}Mn_{1.97}O_4$ cell delivers on discharge 100 mAh/g at an average voltage of approximately 3.9V, as indicated in FIG. 9, a cell in accordance with the invention and having the configuration $Li_4Ti_5O_{12}$/Electrolyte/$Li_{1.03}Mn_{1.97}O_4$ (4) was constructed.

The $Li_{1.03}Mn_{1.97}O_4$ spinel compound of the cathode was synthesized as in Example 2.

$Li_4Ti_5O_{12}$ was synthesized by the reaction of $Li_2CO_3$ and $TiO_2$, using a Li/Ti atomic ratio of 0.87, at 500° C. for 12 hours and at 1000° C. for 24 hours. A slight excess of lithium was used because of the volatility of $Li_2O$ at that temperature. The powder X-ray diffraction pattern of this compound is shown in FIG. 1c. The pattern is predominantly characteristic of the $Li_4Ti_5O_{12}$ spinel phase.

Figure 13:
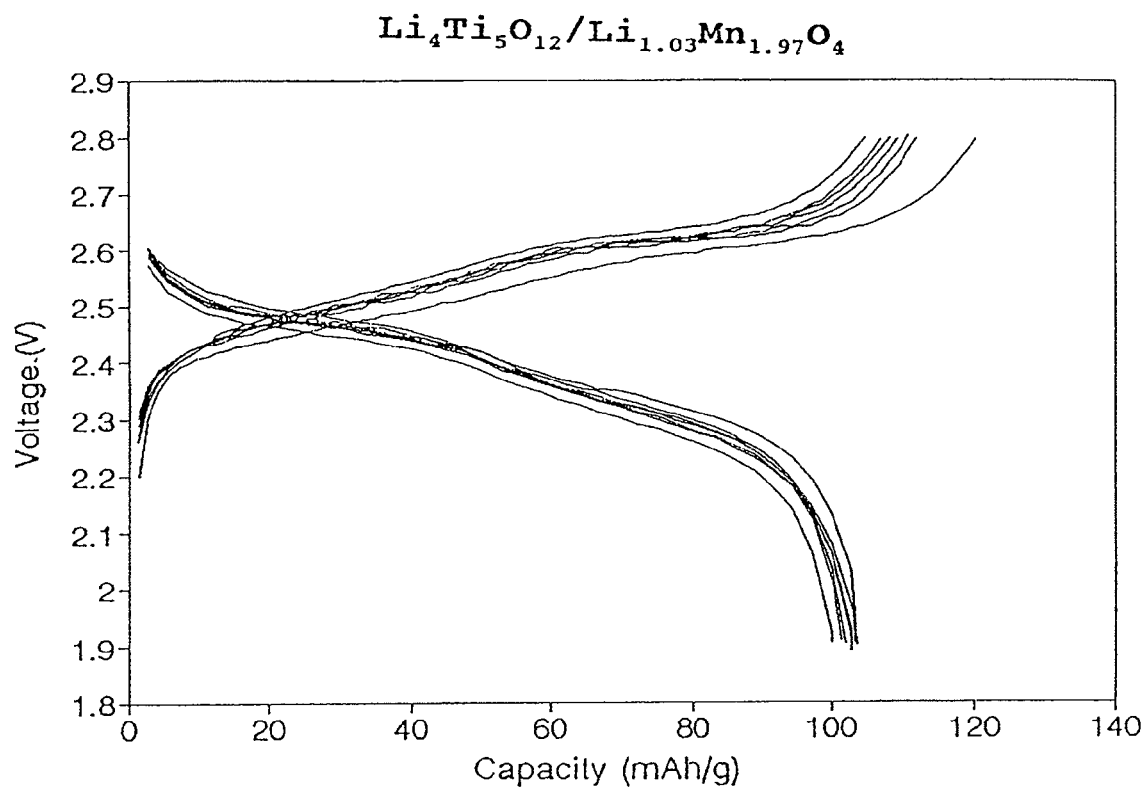
FIG. 13 shows a plot of voltage vs capacity for the cell of Example 3 and which is in accordance with the invention.

A cell of the format $Li_4Ti_5O_{12}$/Electrolyte/$Li_{1.03}Mn_{1.97}O_4$ (4) was then constructed. The electrolyte used was 1M $LiClO_4$ in propylene carbonate. The first 7 charge/discharge cycles of the cell are shown in FIG. 13. A current of 0.1 mA was employed for both charge and discharge. The cell was cycled between upper and lower voltage limits of 2.8V and 1.9V respectively.

EXAMPLE 4

Figure 10:
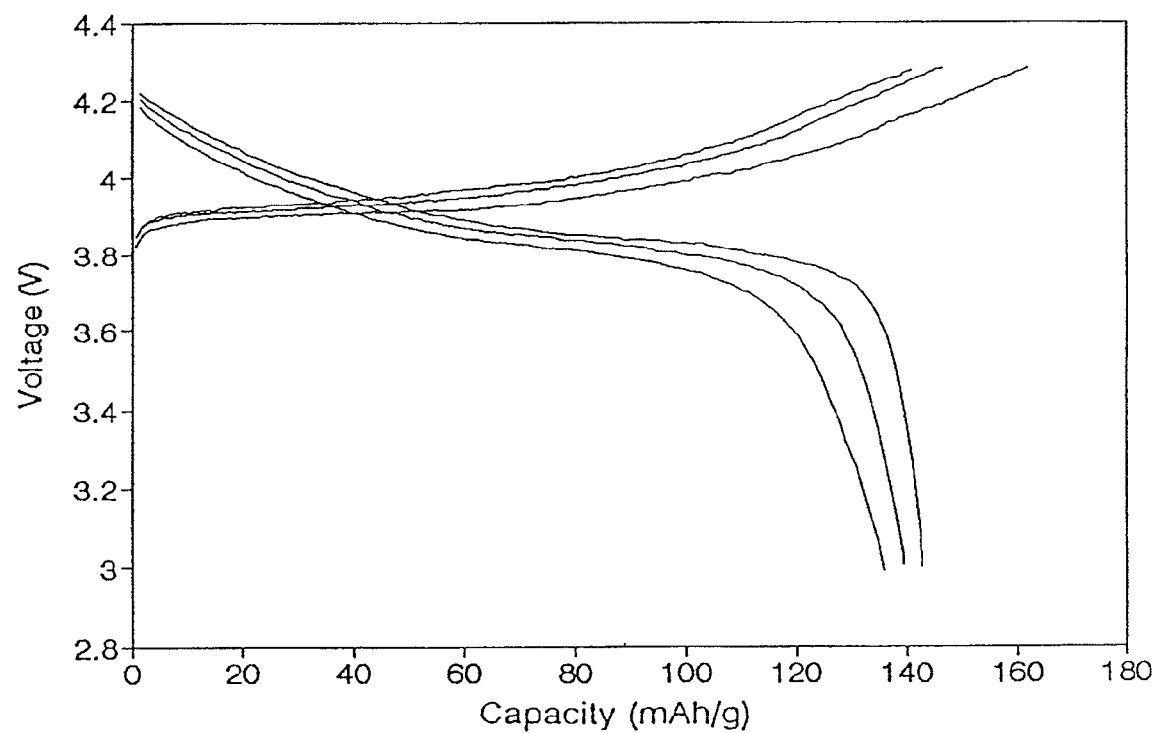
FIG. 10 shows a plot of voltage vs capacity for a known $Li/LiCoO_2$ cell.

In view thereof that a $Li/Li_4Ti_5O_{12}$ cell delivers on discharge 120 mA·Hrs/g at an average voltage of approximately 1.5V, as indicated in FIG. 5, and a $Li/LiCoO_2$ cell delivers on discharge 140 mA·Hrs/g at an average voltage of approximately 3.9V, as indicated in FIG. 10, a cell in accordance with the invention and having the configuration $Li_4Ti_5O_{12}$/Electrolyte/$LiCoO_2$ (5) was constructed.

The $LiCoO_2$ spinel compound of the cathode was synthesized by the reaction of $CoCO_3$ and $Li_2CO_3$ firstly at 400° C. for 48 hours and thereafter at 900° C. for 48 hours. The powder X-ray diffraction pattern of this compound is shown in FIG. 2c.

$Li_4Ti_5O_{12}$ synthesized as in Example 3, was used for the anode in this example.

Figure 14:
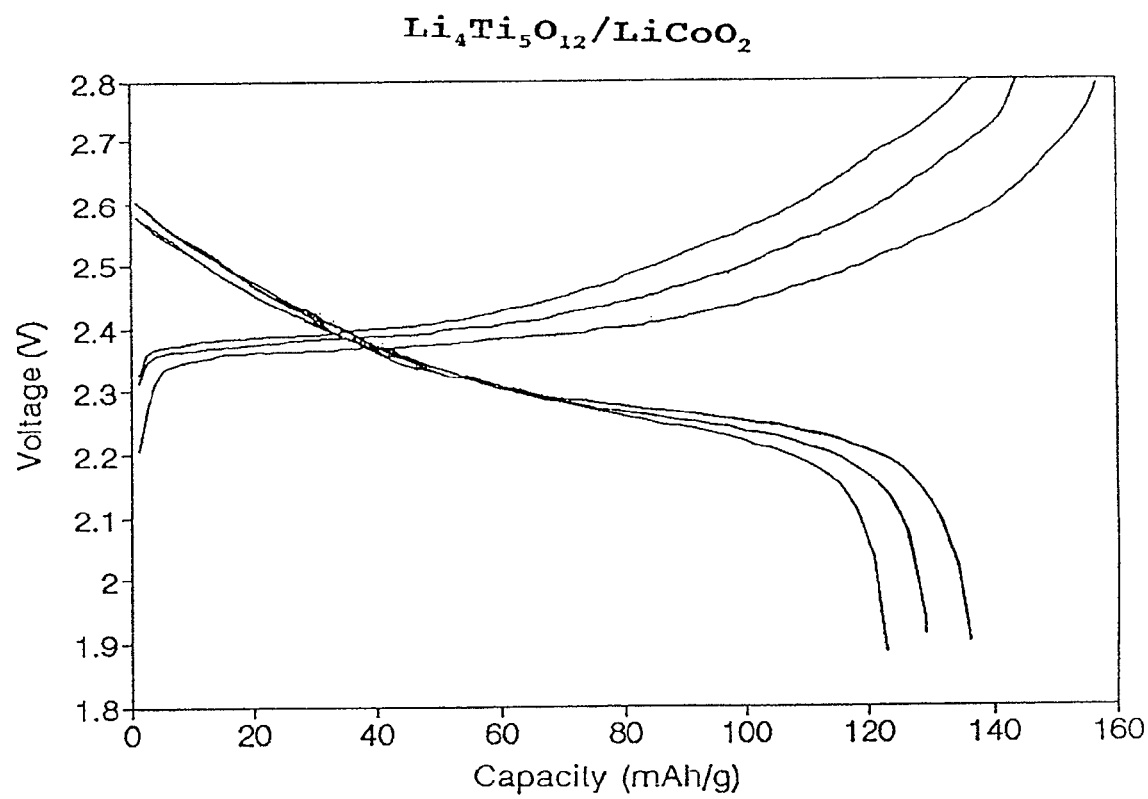
FIG. 14 shows a plot of voltage vs capacity for the cell of Example 4 and which is in accordance with the invention.

A cell of the format $Li_4Ti_5O_{12}$/Electrolyte/$LiCoO_2$ (5) was then constructed. The electrolyte used was 1M $LiCoO_4$ in propylene carbonate. The first 3 charge/discharge cycles of the cell are shown in FIG. 14. A current of 0.1 mA was employed for both charge and discharge. The cell was cycled between upper and lower voltage limits of 2.8V and 1.9V respectively.

EXAMPLE 5

Figure 6:
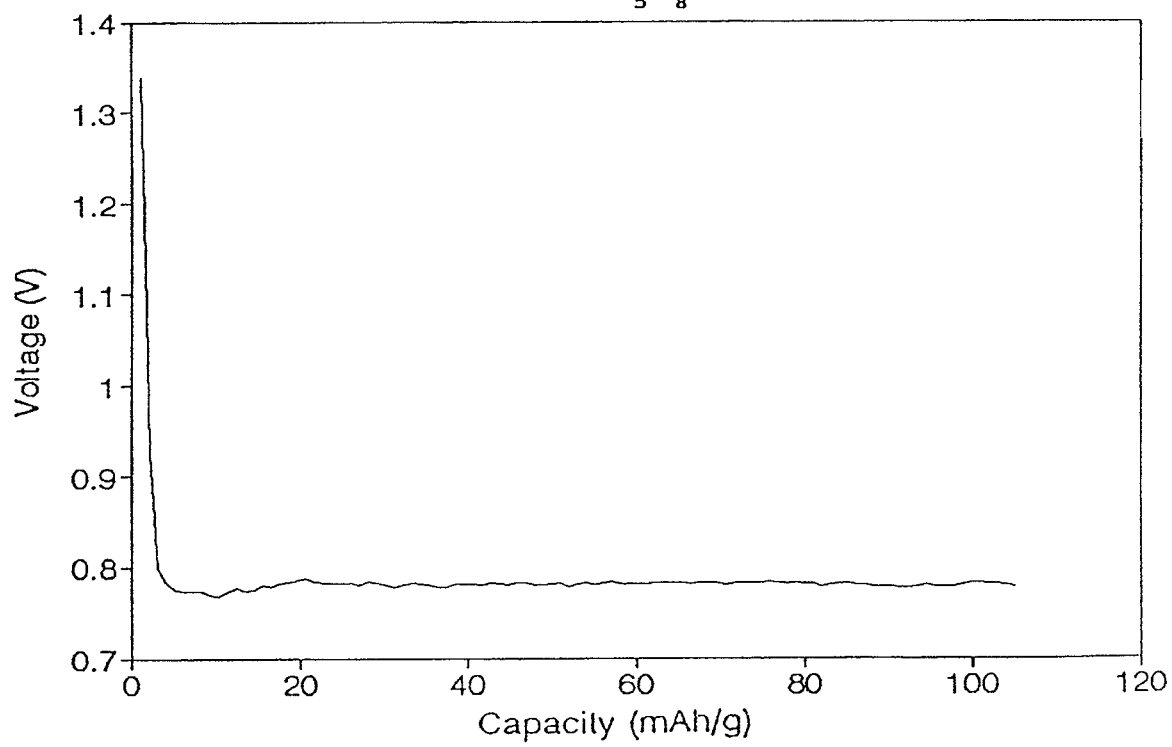
FIG. 6 shows a plot of voltage vs capacity for a known $Li/LiFe_5O_8$ cell.

In view thereof that a $Li/LiFe_5O_8$ cell delivers on discharge 100 mAh/g at an average voltage of approximately 1.0V, as indicated in FIG. 6, and a $Li/Li_{1.05}Mn_{1.97}O_4$ cell delivers on discharge 100 mAh/g at an average voltage of approximately 3.9V, as indicated in FIG. 9, a cell in accordance with the invention and having the configuration $LiFe_5O_8$/Electrolyte/$Li_{1.03}Mn_{1.97}O_4$ (6) was constructed.

The $Li_{1.03}Mn_{1.97}O_4$ spinel compound of the cathode was synthesized as in Example 2.

$LiFe_5O_8$ was synthesized by reacting of $Li_2CO_3$ and α-$Fe_2O_3$ in a 1:5 molar ratio at 900° C. for 24 hours. The powder X-ray diffraction pattern of this compound is shown in FIG. 1d.

Figure 15:
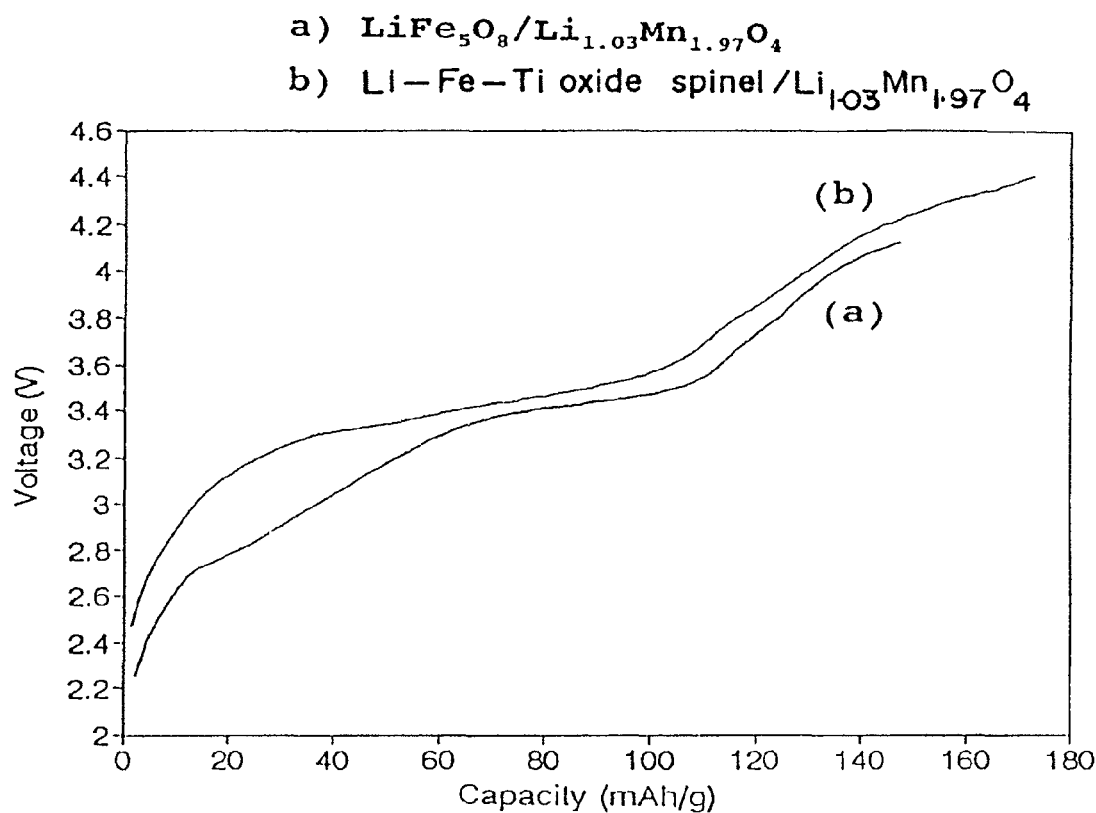
FIG. 15 shows plots of voltage vs capacity for the cells of Examples 5 and 6 and which are in accordance with the invention.

A cell of the format $LiFe_5O_8$/Electrolyte/$Li_{1.03}Mn_{1.97}O_4$ (6) was then constructed. The electrolyte used was 1M $LiClO_4$ in propylene carbonate. The first charge cycle of the cell is shown in FIG. 15a. A current of 0.1 mA was employed for both charge and discharge. The cell had an upper voltage limit of 4.1V.

EXAMPLE 6

Figure 7:
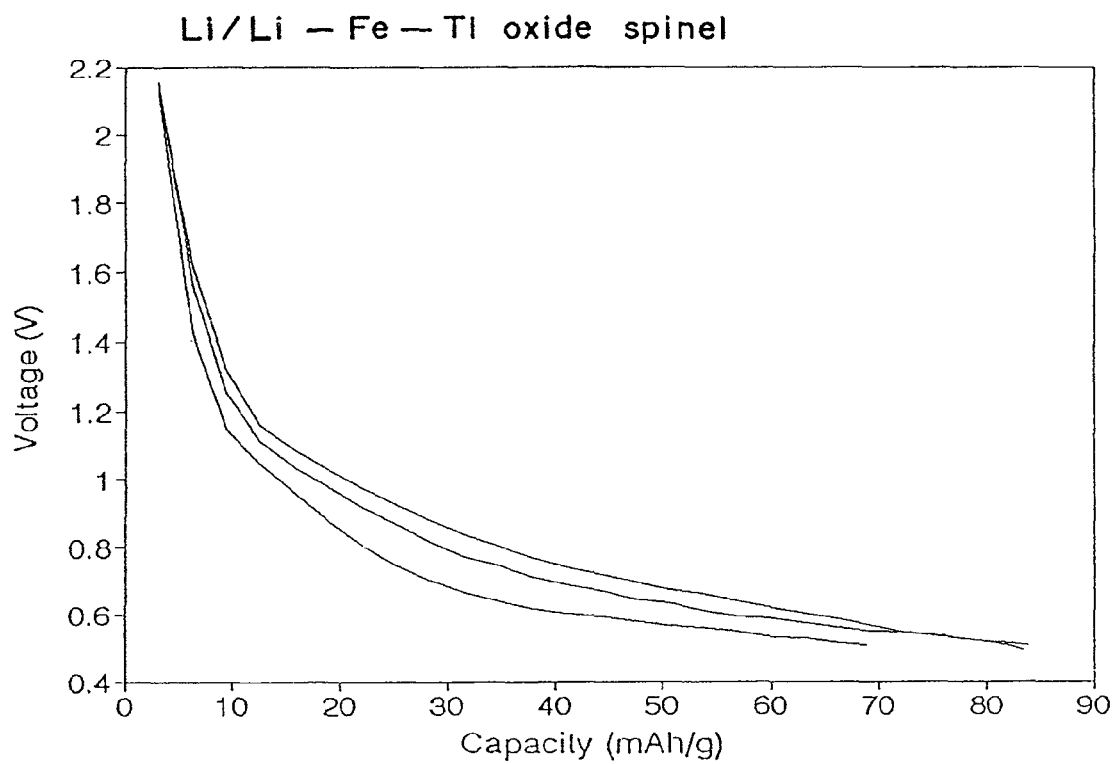
FIG. 7 shows a plot of voltage vs capacity for a Li/Li—Fe—Ti oxide cell.

In view thereof that a Li/Li—Fe—Ti oxide spinel cell delivers on discharge 80 mAh/g at an average voltage of approximately 0.6V, as indicated in FIG. 7, and a Li/Li$_{1.03}$Mn$_{1.97}$O$_4$ cell delivers on discharge 100 mAh/g at an average voltage of approximately 3.9V, as indicated in FIG. 9, a cell in accordance with the invention and having the configuration Li—Fe—Ti oxide spinel/Electrolyte/Li$_{1.03}$Mn$_{1.97}$O$_4$ (7) was constructed.

The Li$_{1.03}$Mn$_{1.97}$O$_4$ spinel compound of the cathode was synthesized as in Example 2.

A Li—Fe—Ti oxide spinel was synthesized by the reaction of Li$_2$CO$_3$ and Fe$_2$TiO$_5$, using a Li:Fe:Ti atomic ratio of 2:2:1, at 500° C. for 6 hours and at 900° C. for 16 hours. The powder X-ray diffraction pattern of this compound is shown FIG. 1e. The pattern is predominantly characteristic of a spinel-type phase.

A cell of the format Li—Fe—Ti oxide spinel/Electrolyte/Li$_{1.03}$Mn$_{1.97}$O$_4$ (7) was then constructed. The electrolyte used was 1M LiClO$_4$ in propylene carbonate. The first charge cycle of the cell is shown in FIG. 15b. A current of 0.1 mA was employed for both charge and discharge. The cell had an upper voltage limit of 4.4V.

EXAMPLE 7

Figure 16:
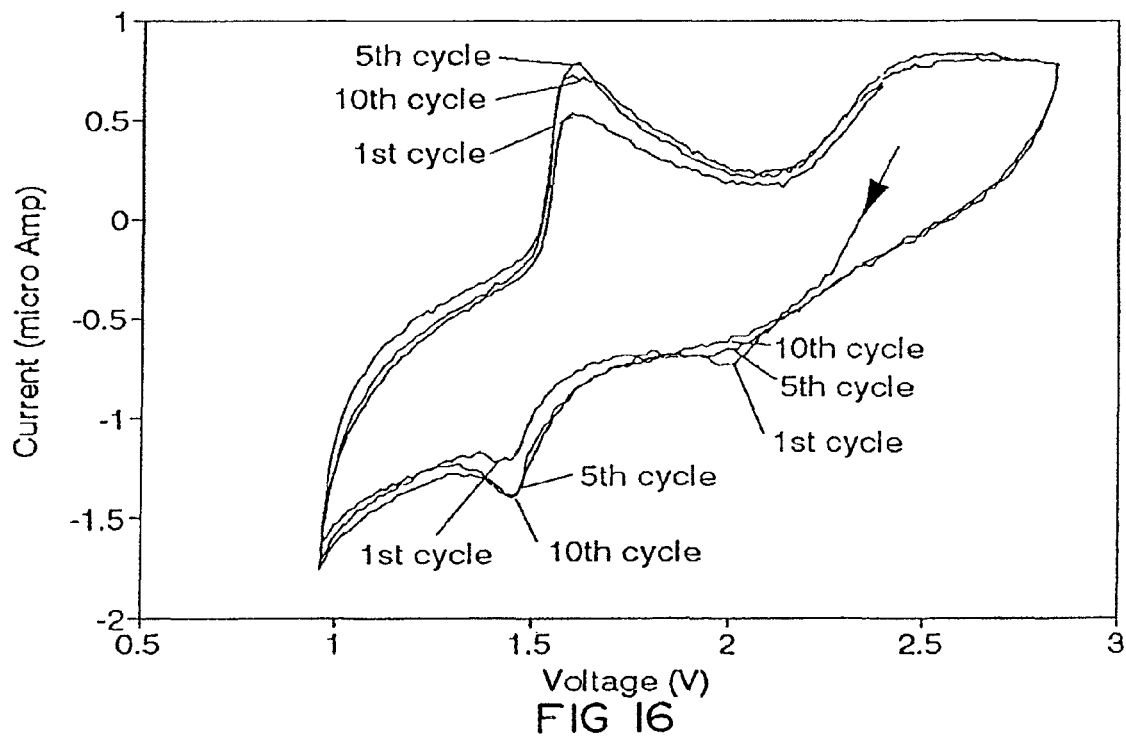
FIG. 16 shows a cyclic voltammogram of the Li/Li—Fe—Ti oxide spinel cell of Example 7.

A Li—Fe—Ti oxide spinel was synthesized by the reaction Li$_2$CO$_3$ and Fe$_2$TiO$_3$ using a Li:Fe:Ti atomic ratio of 1:2:1 at 500° C. for 6 hours, and thereafter at 900° C. for 16 hours. A cyclic voltammogram of a Li/Li—Fe—Ti oxide spinel cell with an electrolyte of 1M LiCO$_4$ in propylene carbonate is shown in FIG. 16. It shows the rechargeable characteristics of the Li—Fe—Ti oxide spinel electrode, and in particular, the rechargeability of the Li insertion/extraction reaction that occurs at approximately 1.5V versus lithium.

Examples 5, 6 and 7 show, in particular, the potential of using spinel-type oxides containing iron as anodes because they provide a low voltage against lithium. Furthermore, the experimental data provided in the examples demonstrate the ability of transition metal oxides to provide an electrochemical couple for 'rocking chair' rechargeable lithium cells in which lithium ions are transported between the two transition metal oxide electrodes, the anode of which has a spinel-type structure, and which uses a liquid or polymeric electrolyte containing Li$^+$ ions. The electrochemical cells of the invention thus contain no metallic lithium anode, and are therefore inherently safer than lithium cells containing metallic lithium anodes and, indeed, lithium-carbon anodes. In particular, such cells have an added advantage of providing a more constant operating voltage than cells with carbon anodes.

Although the cells of the invention are designed primarily for the use as rechargeable cells, they can also, as indicated hereinbefore, be utilized as primary cells, if desired.

Although the principles of this invention have been demonstrated by use of lithium-metal oxide compounds, the compounds of the electrodes, instead of being oxides, can be sulphides.

The invention claimed is:

1. An electrochemical cell comprising:
   as at least part of an anode, a lithium transition metal oxide compound which has a [B$_2$]X$_4^{n-}$ spinel-type framework structure of an A[B$_2$]X$_4$ stoichiometric spinel or defect spinel, wherein A comprises Li, B comprises Li and Ti, X is oxygen (O), and n– refers to the overall charge of the structural unit [B$_2$]X$_4^{n-}$ of the framework structure, and the transition metal cation of which in the fully discharged state of the cell has a mean oxidation state of +4 for Ti;
   as at least part of a cathode, a compound with a structure type other than a lithium-metal-oxide compound; and
   an electrically insulative, lithium containing, liquid or polymeric, ionically conductive electrolyte between the anode and the cathode, such that, on discharging the cell, lithium ions are extracted from the spinel-type framework structure of the anode, with the oxidation state of the metal ions of the anode thereby increasing, while a concomitant insertion of lithium ions into the compound of the cathode takes place, with the oxidation state of the metal ions of the cathode decreasing correspondingly.

2. The electrochemical cell of claim 1, wherein, in the compound of the anode, the [B$_2$]X$_4^{n-}$ framework structure contains, within the framework structure or within interstitial spaces present in the framework structure, additional metal cations to the lithium ions and the other A and B cations, with the additional metal cations being present in an amount less than 10 atomic percent.

3. The electrochemical cell of claim 1, wherein the cathode comprises a lithium metal sulfide compound.

4. The electrochemical cell of claim 1, wherein the electrolyte is a room temperature electrolyte selected from the group consisting of LiClO$_4$, LiBF$_4$ and LiPF$_6$ dissolved in an organic solvent selected from the group consisting of propylene carbonate, ethylene carbonate, dimethyl carbonate, dimethoxyethane and mixtures thereof.

5. The electrochemical cell of claim 1, wherein the electrolyte is a polymeric electrolyte selected from the group consisting of polyethylene oxide (PEO)—LiClO$_4$, PEO—LiSO$_3$CF$_3$, and PEO—LiN(CF$_3$SO$_2$)$_2$.

* * * * *

UNITED STATES PATENT AND TRADEMARK OFFICE
CERTIFICATE OF CORRECTION

| | | |
|---|---|---|
| PATENT NO. | : 7,964,310 B2 | |
| APPLICATION NO. | : 12/972066 | |
| DATED | : June 21, 2011 | |
| INVENTOR(S) | : Michael M. Thackeray et al. | |

It is certified that error appears in the above-identified patent and that said Letters Patent is hereby corrected as shown below:

On the title page, item (57) Abstract, line 9, delete "+3.5" and insert -- +3,5 -- therefor.

Signed and Sealed this
Sixth Day of September, 2011

David J. Kappos
*Director of the United States Patent and Trademark Office*